US006137674A

United States Patent [19]

Jedlitschka

[11] Patent Number: 6,137,674

[45] Date of Patent: Oct. 24, 2000

[54] HIGH-VOLTAGE POWER SUPPLY UNIT PARTICULARLY FOR X-RAY SOURCES

[75] Inventor: Hans Jedlitschka, Chatillon, France

[73] Assignee: GE Medical Systems, S.A.

[21] Appl. No.: 09/168,788

[22] Filed: Oct. 8, 1998

[30] Foreign Application Priority Data

Oct. 9, 1997 [FR] France .................................. 97 12608

[51] Int. Cl.[7] ........................................................ H02B 1/04

[52] U.S. Cl. ....................... 361/623; 174/17 LF; 220/453

[58] Field of Search ................................ 174/15.1, 17 R, 174/17 LF, 52.1; 336/90; 361/600, 622, 623, 679, 688, 699, 724, 807, 812; 220/453, 457; 156/336; 428/251, 282, 344, 359, 401, 911, 920, 921, 35, 216, 461; 378/101, 105, 193, 200

[56] References Cited

U.S. PATENT DOCUMENTS

| | | | |
|---|---|---|---|
| 2,909,664 | 10/1959 | Zunick et al. | 250/90 |
| 3,833,129 | 9/1974 | Madsen . | |
| 4,338,657 | 7/1982 | Lisin et al. | 363/68 |
| 4,381,716 | 5/1983 | Hastings . | |
| 4,405,076 | 9/1983 | Lines, Jr. . | |
| 4,523,528 | 6/1985 | Hastings . | |
| 4,648,929 | 3/1987 | Siman . | |
| 4,762,965 | 8/1988 | Hata . | |
| 4,920,554 | 4/1990 | Gabbay . | |
| 4,964,933 | 10/1990 | Hata . | |
| 5,148,459 | 9/1992 | Yahata | 378/105 |
| 5,363,286 | 11/1994 | Tsuchiya | 363/8 |

FOREIGN PATENT DOCUMENTS

| | | |
|---|---|---|
| 0314553 | 5/1989 | European Pat. Off. . |
| 0477857 | 4/1992 | European Pat. Off. . |
| 1564340 | 7/1969 | Germany . |
| 3833129 | 4/1989 | Germany . |

*Primary Examiner*—Gerald Tolin
*Attorney, Agent, or Firm*—Jay L. Chaskin

[57] ABSTRACT

A high-voltage power supply unit having electrical components encased in insulating casings which are biodegradable. The insulating casings comprise several superimposed layers, joined together, of sheets of paper, the number of layers being chosen in order to obtain the desired amount of electrical insulation to suit the strength of the electric field surrounding the insulated electrical components when the unit is in operation.

This has a application to providing power to X-ray sources.

19 Claims, 1 Drawing Sheet

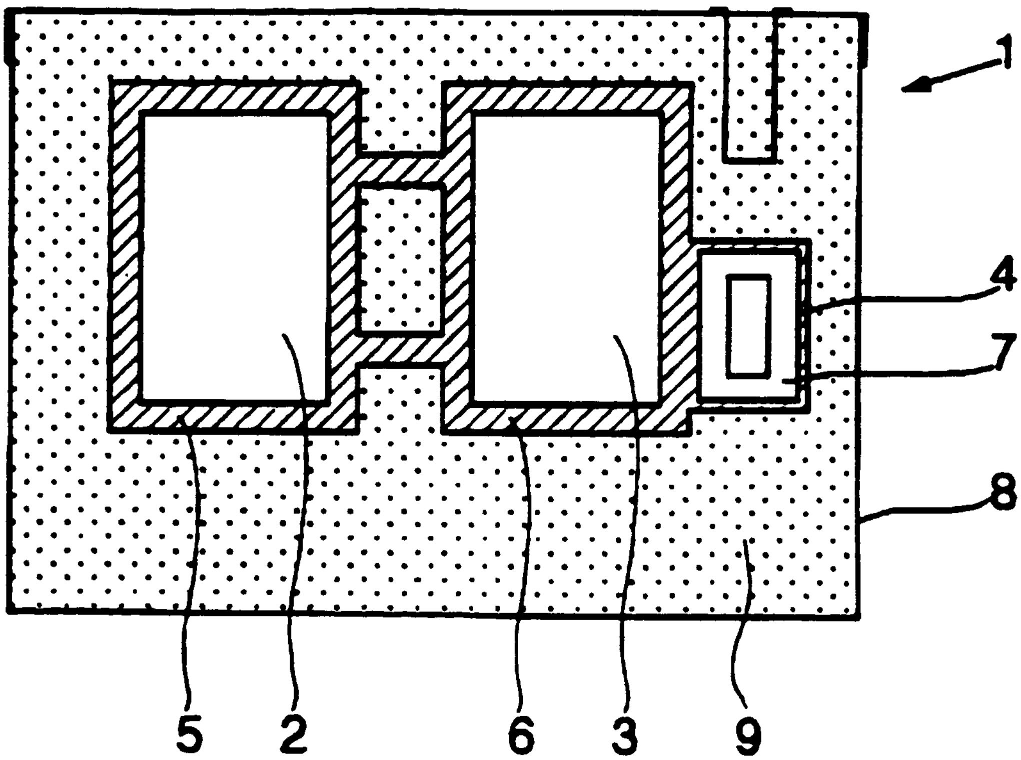
1
4
7
8
5
2
6
3
9

HIGH-VOLTAGE POWER SUPPLY UNIT PARTICULARLY FOR X-RAY SOURCES

BACKGROUND OF THE INVENTION

The present invention relates in general to high-voltage (HT) power supply units, particularly for X-ray sources, which units are biodegradable.

Conventional HT power supply units include components which are encased in electrically insulating cases. These components are arranged in an earthed box which is vacuum filled with an electrically insulating and cooling medium. The casings of the components are generally made by injection-molding of plastic. These injection-molded plastic casings need to be free of geometric defects and not to contain inclusions of gas which will detract from electrical insulation.

The plastic insulating casings and the insulating oil represent most (greater than 60% by volume) of the HT power supply unit, and this poses problems with recycling and safety and with respect to the environment.

Furthermore, it would be desirable to choose the thickness of the casings to suit the strength of the surrounding electrical field. Altering the thickness in this way is not compatible with injection-molding techniques which require a constant thickness in order to avoid geometric defects and/or inclusions of gas.

It would be desirable to provide a HT power supply units in which the materials used to insulate the electrical components readily allow the thickness of the insulation to be altered to suit the strength of the electric field that there is around the component and which are preferably biodegradable.

BRIEF SUMMARY OF THE INVENTION

An embodiment of the invention is a power supply unit for which most of the materials used to make it are recyclable and do not have harmful effects on the environment, and in particular are biodegradable materials.

An embodiment of the invention is a biodegradable high-voltage power supply unit comprising electrical components encased in electrically insulating casings wherein the insulating casings comprise several superimposed layers, joined together, of sheets of paper, the number of layers being chosen in order to obtain the desired amount of electrical insulation to suit the strength of the electric field surrounding the insulated electrical components when the unit is in operation.

An embodiment of the present invention is therefore also a biodegradable HT power supply unit, particularly for X-ray sources, the electrical components of which are contained in insulating casings the thickness of which can readily be chosen to suit the strength of the surrounding electric field.

BRIEF DESCRIPTION OF THE DRAWING

The single FIGURE depicts a conventional layout of an HT power supply unit for X-ray sources.

DETAILED DESCRIPTION OF THE INVENTION

Referring to the FIGURE, the HT power supply unit 1 comprises an HT transformer 2, a voltage multiplier/rectifier device 3, and an HT output device 4.

The components of the HT transformer 2, such as the windings, the components of the voltage multiplier/rectifier device and of the HT output device 4, such as the transistors, the smoothing capacitors and the resistors, are encased in electrically insulating casings 5, 6, and 7, respectively.

The HT transformer 2, the voltage multiplier/rectifier device 3, the output device 4 and the appropriate electrical connections are arranged in an earthed metal box 8 vacuum-filled with an electrically insulating and cooling medium 9, such as a mineral oil, in order to obtain the desired resistance to the high voltages which are generally between 30 Kv and 150 Kv.

The electrically insulating casings 5, 6, and 7 of the HT transformer 2, of the voltage multiplier/rectifier device 3 and of the HT output device 4 are generally made by injection-molding of plastic. These injection-molded plastic casings need to be free of geometric defects and need not to contain inclusions of gas which detract from the electrical insulation.

An embodiment of the invention comprises a HT power supply unit in which the electrical components are encased in insulating casings comprising several superimposed layers, joined together, of sheets of paper. The number of sheets are chosen in order to obtain the desired amount of electrical insulation to suit the strength of the electric field surrounding the insulated electrical components when the HT power supply unit is in operation.

The layers of sheets of paper are generally joined together by an electrically insulating adhesive that can resist the insulating and cooling medium such as a mineral or vegetable oil. As a preference, use is made of a cellulose-based glue which is biodegradable.

In general, the layers of sheets of paper of which the casings are formed are impregnated with an insulating mineral or vegetable oil and compressed.

It has been discovered that a stack of five layers of sheets of paper 12 $\mu$m thick impregnated with conventional insulating mineral or vegetable oil is able to withstand a potential difference of 14 kv.

The stacks of sheets of paper can easily be pressed to make winding casings and boxes and lids and it is easy, during the manufacturing method for pressing to obtain different wall thicknesses by adding layers of sheets of paper.

It is recommended that the impregnation oil and the oil that constitutes the insulating and cooling medium should be an insulating vegetable oil such as grape seed oil. Such insulating vegetable oils are known and have dielectric properties comparable with insulating mineral oils and better vapor tensions. Furthermore, they have the advantage of being biodegradable and therefore not harmful to the environment.

Various modifications in structure and/or function and/or steps may be made by one skilled in the art to the disclosed embodiments without departing from the scope and extent of the invention.

What is claimed is:

1. A high-voltage power supply enclosure comprising electrical components respectively disposed in a plurality of electrical insulating casings wherein the entirety of each insulating casing is formed of a biodegradable material and each casing comprises several superimposed layers, joined together, of sheets of paper, the number of sheets of layers being chosen in order to obtain the desired amount of electrical insulation to suit the strength of the electric field surrounding the insulated electrical components when the enclosure is in operation.

2. High-voltage power supply enclosure according to claim 1 wherein the superimposed layers of sheets of paper are impregnated with insulating mineral or vegetable oil.

3. High-voltage power supply enclosure according to claim 1 wherein the layers of sheets of paper are joined together by an electrically insulating biodegradable adhesive.

4. High-voltage power supply enclosure according to claim 2 wherein the layers of sheets of paper are joined together by an electrically insulating biodegradable adhesive.

5. High-voltage power supply enclosure according to claim 3 wherein the adhesive is a cellulose-based glue.

6. High-voltage power supply enclosure according to claim 4 wherein the adhesive is a cellulose-based glue.

7. A high-voltage power supply enclosure comprising a metal casing filled with an electrically insulating and cooling medium and a plurality of electrical insulating casings disposed in the metal casing wherein each of the entirety of the insulating casings are formed of a biodegradable material and wherein within each casing electrical components are encased.

8. High-voltage power supply enclosure according to claim 7 wherein the electrically insulating and cooling medium is an insulating vegetable oil.

9. High-voltage power supply enclosure according to claim 7 wherein the casings are impregnated with insulating mineral or vegetable oil.

10. High-voltage power supply enclosure according to claim 7 wherein the casings comprised a stack of sheets of paper.

11. High-voltage power supply enclosure according to claim 10 wherein the stack has layers joined together by an electrically insulating biodegradable adhesive.

12. High-voltage power supply enclosure according to claim 11 wherein the adhesive is a cellulose-based glue.

13. High-voltage power supply enclosure according to claim 1 wherein the superimposed layers form a stack of five layers.

14. High-voltage power supply enclosure according to claim 1 wherein each layer is 12 $\mu$m thick.

15. High-voltage power supply enclosure according to claim 7 wherein the layers form a stack of five layers.

16. High-voltage power supply enclosure according to claim 7 wherein each layer is 12 $\mu$m thick.

17. High-voltage power supply enclosure according to claim 2 wherein the impregnating oil is grape seed oil.

18. High-voltage supply enclosure according to claim 8 wherein the impregnating oil is grape seed oil.

19. High-voltage power supply enclosure according to claim 8 wherein the insulating and cooling medium is grape seed oil.

* * * * *